US010831420B2

(12) United States Patent
Mohammad

(10) Patent No.: US 10,831,420 B2
(45) Date of Patent: Nov. 10, 2020

(54) DISTRIBUTED PRINTING

(71) Applicant: Hewlett-Packard Development Company, L.P., Spring, TX (US)

(72) Inventor: Nassir Mohammad, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/334,921

(22) PCT Filed: Oct. 17, 2016

(86) PCT No.: PCT/US2016/057403
§ 371 (c)(1),
(2) Date: Mar. 20, 2019

(87) PCT Pub. No.: WO2018/075004
PCT Pub. Date: Apr. 26, 2018

(65) Prior Publication Data
US 2019/0265919 A1    Aug. 29, 2019

(51) Int. Cl.
*G06F 3/12* (2006.01)
(52) U.S. Cl.
CPC .......... *G06F 3/1222* (2013.01); *G06F 3/1267* (2013.01); *G06F 3/1291* (2013.01)
(58) Field of Classification Search
CPC ..... G06F 3/1222; G06F 3/1291; G06F 3/1267
See application file for complete search history.

(56) References Cited

U.S. PATENT DOCUMENTS

| 9,076,100 | B2 | 7/2015 | Okada | |
|---|---|---|---|---|
| 9,098,220 | B2 | 8/2015 | Kikuchi | |
| 9,244,639 | B2 | 1/2016 | Marquardt | |
| 2001/0038462 | A1* | 11/2001 | Teeuwen | H04N 1/00204 358/1.15 |
| 2007/0279677 | A1* | 12/2007 | Su | G06F 3/1205 358/1.15 |
| 2012/0069381 | A1* | 3/2012 | Nagai | G06F 3/122 358/1.14 |
| 2013/0103694 | A1* | 4/2013 | Luong | G06F 16/2255 707/747 |
| 2014/0368867 | A1 | 12/2014 | Kim et al. | |

OTHER PUBLICATIONS

Free Document and Workflow Solutions, <http://www.samsung.com/us/business/printersolutions/business-core-printing-solutions.html>.

* cited by examiner

*Primary Examiner* — Neil R McLean
(74) *Attorney, Agent, or Firm* — Tong Rea Bentley & Kim LLC

(57) ABSTRACT

Aspects of the present disclosure relate to a method of performing a pull printing operation. In one example, the method comprises receiving at a source printer, from a client device, data defining a print job, wherein the source printer comprises a node of a decentralized distributed network of printers. The method then comprises storing the data in a plurality of printers, wherein the plurality of printers comprise nodes of the distributed network. The data is retrievable by a destination printer, wherein the destination printer comprises a node of the distributed network, to print the print job.

15 Claims, 4 Drawing Sheets

DISTRIBUTED PRINTING

BACKGROUND

In a pull printing system, a user's print job is not printed immediately but is instead held in a server, for example a local server, external server or cloud service. The user may then trigger the print job at a particular printer, which pulls the print job from the server and then prints the print job.

BRIEF DESCRIPTION OF THE DRAWINGS

Various features of the present disclosure will be apparent from the detailed description which follows, taken in conjunction with the accompanying drawings, which together illustrate, features of certain examples, and wherein.

DETAILED DESCRIPTION

Certain examples described herein relate to methods for performing a pull printing operation. "Printing" may for example be two dimensional printing onto paper or three dimensional printing, otherwise known as additive manufacture. Pull printing systems help to avoid potential data leaks and to save resources, for example where documents are sent to the wrong printer and/or are not collected. However, operating a pull printing server can present significant hardware and maintenance overheads.

In certain comparative systems, the implementation of a dedicated pull printing server is avoided by configuring a particular networked printer to act as a pull printing server for other networked printers. However, such a system is dependent on the dedicated printer and as such is vulnerable to that printer crashing or otherwise being removed from the network. The processing, bandwidth and storage resources of the dedicated printer may also present a bottleneck, especially in large systems comprising many sites with many different sets of networked printers.

In other comparative systems, the implementation of a dedicated server is avoided by storing a pending pull print job on a user's computer until the job is selected at a particular printer; on selection the print job is then transferred to print at that printer. This system though necessitates a continuous connection between the user's computer and each printer. If this connection is broken, for example if a user shuts down their computer, the job cannot be printed.

According to aspects of the present disclosure, there is provided a method for performing a pull printing operation by submitting a print job to a decentralized distributed network of printers. The print job is stored within the network such that it may be retrieved and printed by a printer of the network. Certain examples described herein thus allow pull printing without a dedicated server and without having a particular printer or client device act as a server, as is used in comparative systems described above. As described in more detail below, this provides a robust and efficient method for printing across a number of geographically diverse sites and/or networks. Unlike comparative systems in which a pending print job is stored on a client device, certain examples described herein may do away with a continuous connection between the client device and the destination printer as the print job is effectively handed off to the distributed network following submission.

Figure 1:
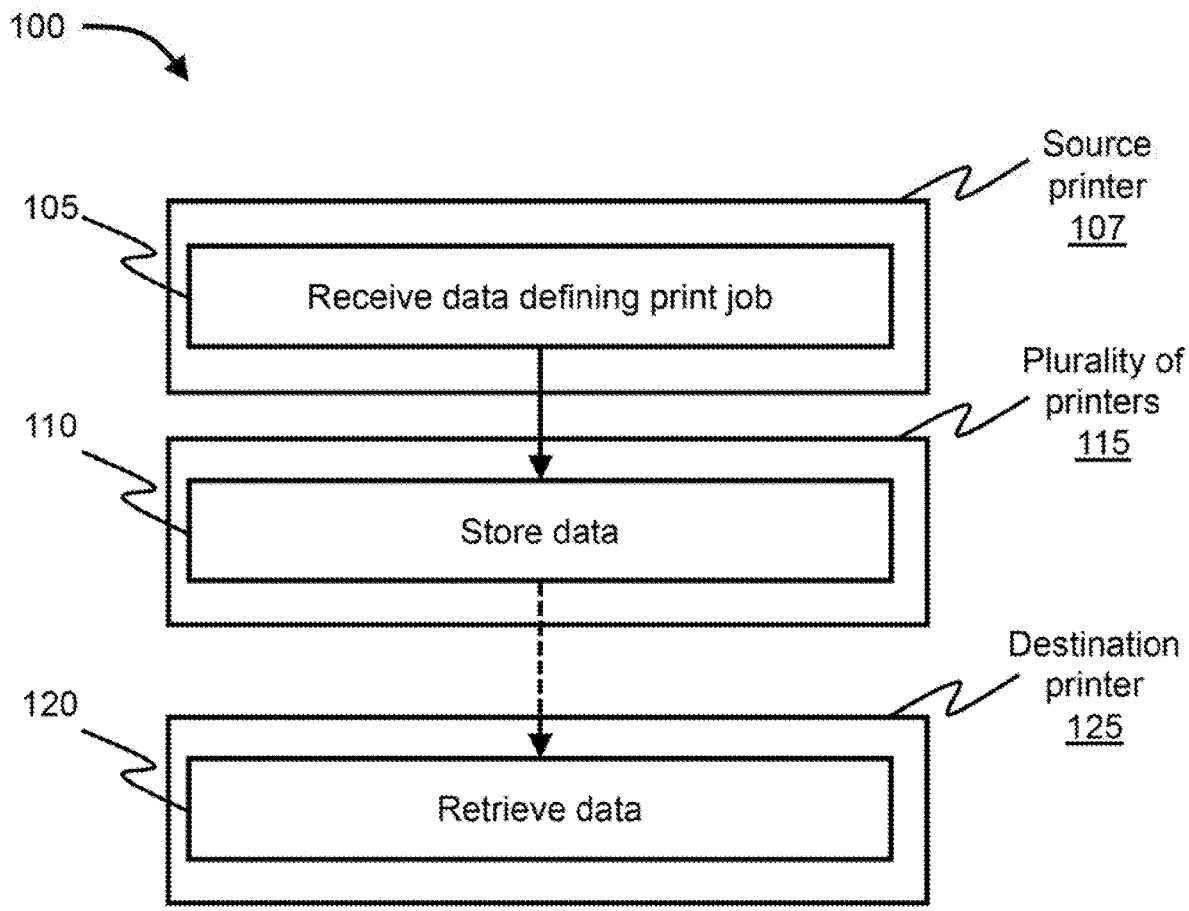
FIG. 1 is a schematic representation of a method of performing a pull print operation.

FIG. 1 is a schematic representation of a method 100 of performing a pull printing operation according to aspects of the present disclosure.

The method 100 comprises receiving 105 at a source printer 107, from a client device, data defining a print job. In this case, a print job may comprise a document to be printed along with associated data, for example a number with which to identify the print job. The document may be in the form of a computer file (e.g. a ".docx" file) or in a print description language. The source printer 107 comprises a node of a decentralized distributed network of printers. The printers of the network may be multi-function printers that also have other functionality, for example photocopying and scanning. In this case, the term "node" may be used to describe a print device whose firmware is suitably configured to implement the example methods described herein, e.g. that may be selected to join a given logical network and to implement the storage and forwarding of print job data as described below.

The method 100 then comprises storing 110 the data in a plurality 115 of printers, the plurality 115 of printers comprising nodes of the distributed network. Each printer of the plurality 113 of printers may be the same or different to each other and to the source printer 107. The data is retrievable 120 by a destination printer 125 to print the print job. The destination printer 125 also comprises a node of the distributed network.

In certain cases, the method 100 may comprise the further operation of retrieving the data to print the print job. For example, a user may, at a point in time following the receipt of the data at the source printer 107, physically access the destination printer 125 and through a user interface therein select the print job for print. This selection may trigger the retrieval of the data from one of the plurality 115 of printers, e.g. a request may be sent from the destination printer 125 to said one of the plurality 115 of printers over a communication channel of the distributed network. The data may then be downloaded and used to instruct a print operation on the destination printer 125. The user may then collect a printed output from the destination printer 125.

Figure 2:
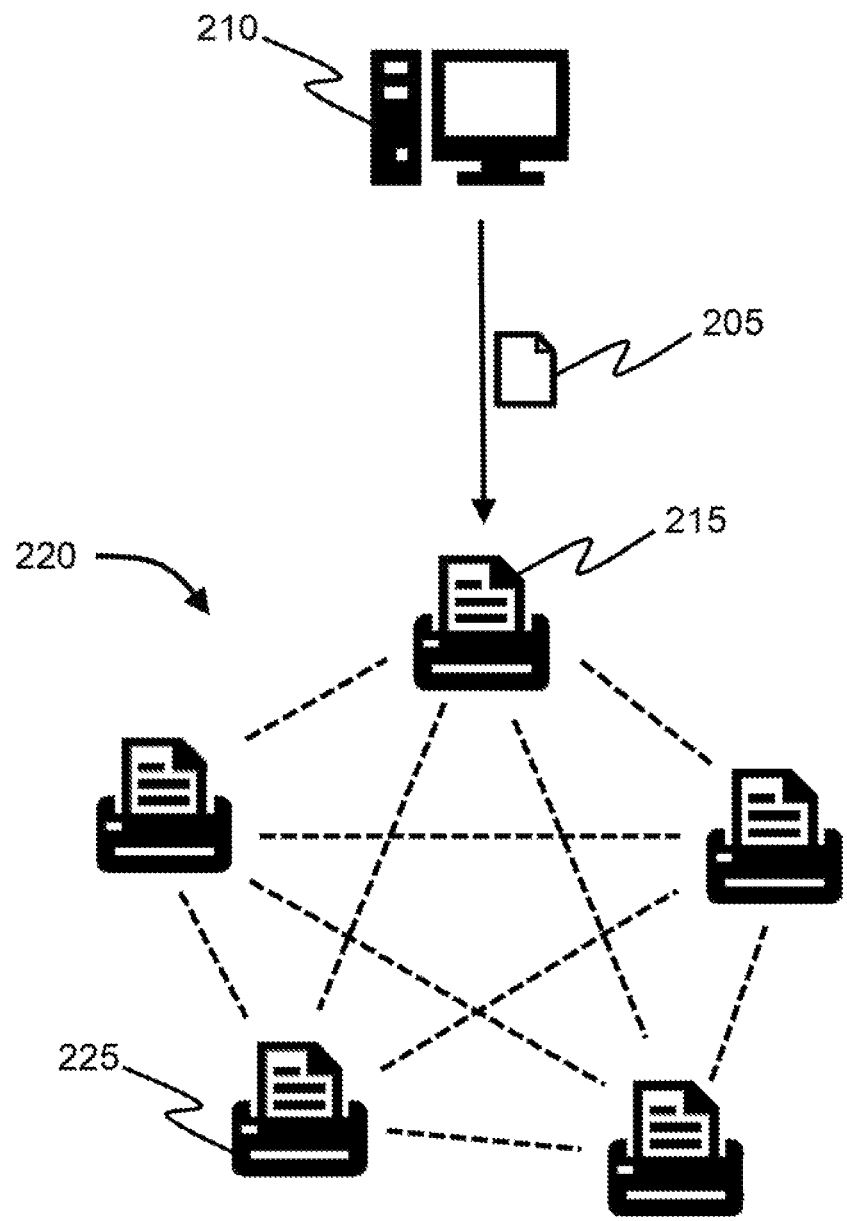
FIG. 2 shows a schematic representation of a system according to an example.

FIG. 2 shows a schematic representation of a system in which the method 100 may be implemented. A print job 205 is transmitted from a client device 210, for example a user's desktop computer or other computing device, to a source printer 215. The print job 205 may be transmitted to the source printer 215 via a wired or wireless connection. For example, the client device 210 and source printer 215 may both be connected to a Local Area Network or Wide Area Network. The source printer comprises a node of a network 220 of printers. Other printers comprise other nodes of the network 220. The nodes may be connected by wired or wireless connections, or by a mixture of wired and wireless connections. In some examples, the printers are connected to a physical network, for example a Local Area Network (LAN) or Wide Area Network (WAN), and the network 220 is a logical network configured on top of the physical network. Such a logical network may also be configured across multiple interconnected physical networks, e.g. multiple LANs coupled by a WAN. The network 220 is a decentralized distributed network, such that there is no particular "main" or "central" node through which all printer-to-printer connections must pass. In some examples, each node is connected directly to each other node, as shown in FIG. 2. In other examples, there may be pairs of nodes of the network 220 that are not directly connected. A connection between such a pair of nodes would be via an intermediary node of the network 220. The network 220 may for example be a distributed hash table network or another type of distributed peer-to-peer network. A distributed hash table is a form of decentralized, distributed system wherein key-value pairs are stored such that any node can efficiently retrieve the value associated with a given key. Any of the nodes of the network 220, for example the printer 225, may then act as the destination printer. The destination printer may be the source printer 215.

In some examples, as shown in FIG. 2, the plurality of printers comprises the source printer 215. In other examples, the plurality of printers does not comprise the source printer 215. For example, the data may be stored in other printers of the network 220. Similarly, the plurality of printers may or may not comprise the destination printer.

The method 100 thus allows pull printing without a server and without a particular single printer to act as a server. As such, pull printing operations may be carried out without incurring the hardware and maintenance overheads of a server-based system. This is particularly the case with a large number of interconnected networks of printing devices, which would otherwise require a correspondingly large number of pull printing servers. As no single server is used, the method 100 also allows pull printing operations without a single point of failure. As no single printer of the network 220 acts as the server, the system is robust to a number of printers leaving or crashing out of the network 220 (provided that a minimum number of printers remain in the network; the specific minimum number will depend on the network configuration). In some examples, a disconnection routine may copy the data stored on a given printer elsewhere in the network before the printer is disconnected. The method 100 may comprise storing a complete copy of the data in a first printer of the plurality of printers and storing a complete copy of the data in a second printer of the plurality of printers. In other examples, the data may be broken up across the plurality of printers such that each printer of the plurality stores only a portion of the data. For example, one such portion could be assigned a main identifier from which identifiers of the other portions may be derived. The portions may thus be merged by the destination printer. The number of copies of the data and/or the number of printers of the network on which the data is stored may be defined by a replication parameter. Storing a larger number of copies increases the total amount of storage space required, but also improves the resilience of the system to removal of one or more printers. Such a replication parameter may be a system-wide parameter, or may be set separately for each print job.

In some examples, the method 100 comprises storing the data in the plurality of printers as encrypted data. For example, when a user selects a print command, e.g. at a client device, the user may be prompted to enter a personal identification number (PIN) to encrypt the job. Alternatively or additionally, the user may be prompted to enter authentication data such as Lightweight Directory Access Protocol (LDAP) login credentials and/or to present a form of identification such as a smart card. In certain cases, encryption may occur transparently based on stored credentials, such as stored encryption keys. The print job may be converted to a suitable format by a print driver, for example it may be wrapped such that the source printer recognizes the job as a pull printing job. The print driver may be installed upon the client device. In some examples, the submitted print job is processed using standard print pipeline filtering techniques, wherein a document to be printed is tagged with a unique Printer Job Language identifier and length. In this context, a print pipeline is a series of operations to convert a pending print job into a format for processing by a given printer. A pipeline filter of the source printer 215 then detects the tag on receipt and directs the document to be stored as a pull print job as opposed to being printed immediately. For example, the document may be wrapped by special Printer Job Language commands so that it can be transmitted to a printer's Transmission Control Protocol (TCP) port 9100, which is typically used for receiving raw print data.

The pipeline filter may retrieve from an input stream the number of bytes indicated by the aforementioned length, and store the retrieved data in a dedicated location of a storage device, for example a hard drive or flash storage, of the source printer 215. The dedicated location may be monitored for new documents by a scheduler program, which then stores the print job in the distributed network for example using a distributed hash table "put" command. Such a command typically has "key" and "data" fields, wherein in the present example the "key" is an identifier of the print job and the "data" is the print job or data associated with the print job such as a file or data defined in a print description language. The data may then be deleted from the dedicated location of the source printer 215 hard drive. In other examples, the data is stored in the distributed network immediately upon being received at the source printer 215.

The print job may be encrypted, for example using a variant of Advanced Encryption Standard (AES). The job may also be cryptographically signed. An identifier for the print job may be generated, for example using a hash of the encrypted print job. The hash may be converted to a shorter string, for example by truncation or by further computations, as a long identifier may not be necessary to uniquely identify the print job. The identifier is then stored in the plurality of printers such that the data may be retrieved responsive to a request, comprising the identifier, submitted to the network from the destination printer. For example, in examples wherein the network is a distributed hash table network, the identifier and data may be stored as a corresponding key and value, respectively.

In one example, the user may be prompted to enter the identifier and/or decryption data such as the aforementioned PIN or smart card into the destination printer, following which the destination printer submits the aforementioned request to retrieve the print job data. Alternatively, the user may be prompted to authenticate their identity at the destination printer and then prompted to select the identifier from a list of their pending print jobs. For example, the user may authenticate their identity with a username and password. As another example, the user may authenticate their identity with a smart card, Radio Frequency Identification (RFID) tag, near-field-communication-equipped smartphone or similar. In some examples, multiple such levels of authentication are used. For example, the user may be prompted to authenticate their identity at the destination printer, following which the user may be prompted to enter the aforementioned decryption data.

If the data is not retrieved by the destination printer within a predefined time interval, such as one week, the method 100 may comprise deleting the data from the plurality of printers. For example, the method may comprise recording the arrival time of each print job and, based on this, periodically deleting unprinted jobs.

Figure 3:
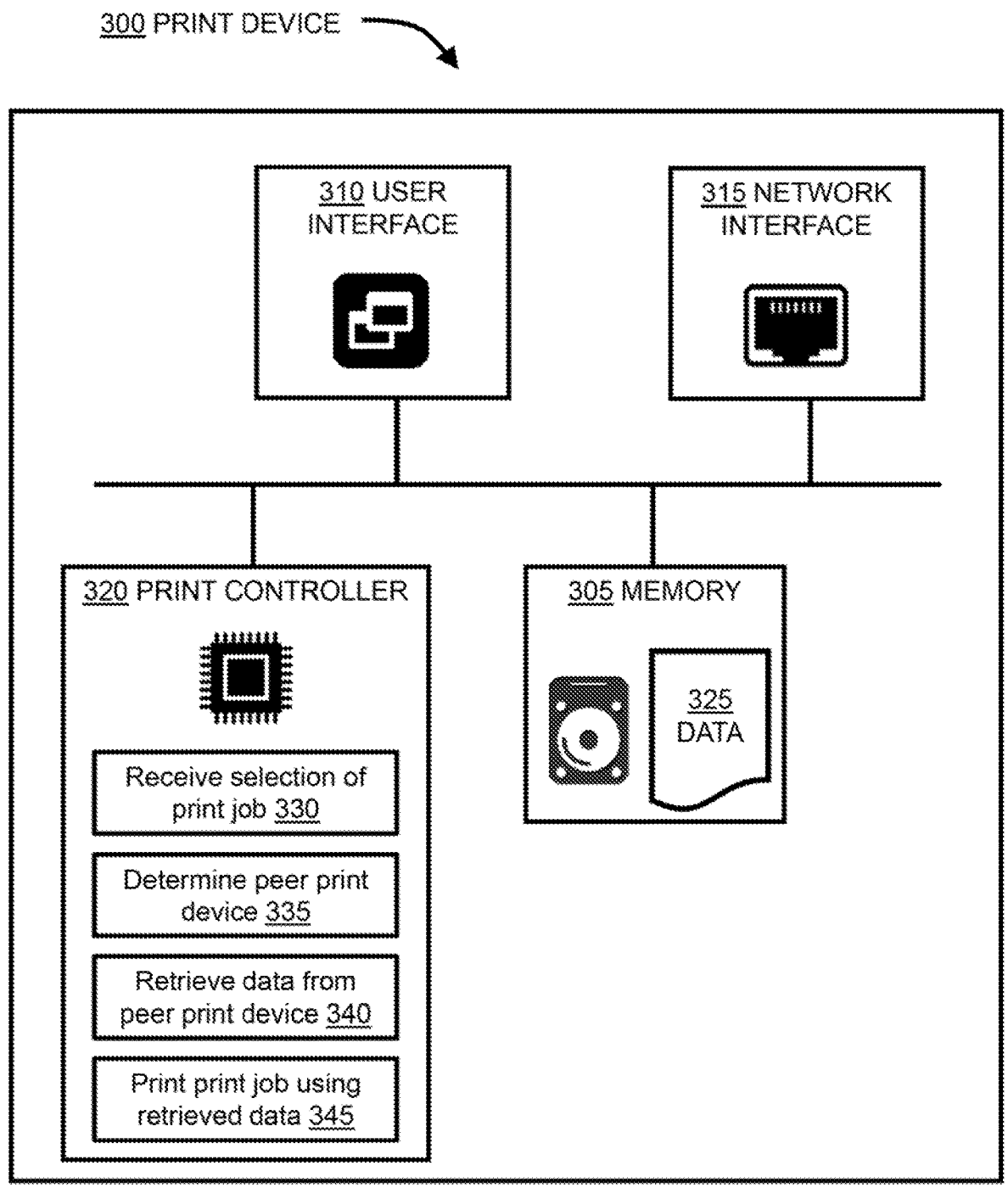
FIG. 3 shows a schematic representation of a print device according to an example.

FIG. 3 shows a schematic representation of a print device 300 according to an example. The print device comprises a memory 305, a user interface 310, a network interface 315 and a print controller 320. The memory 305, which may for example be a hard drive or flash memory, is configured to store print job data 325. The memory may be encrypted, such that print jobs are stored as encrypted data. The network interface 315 is configured to couple the print device 300 to a network of other print devices, for example the network 220. As described above, the network may be a distributed hash table network or another form of peer-to-peer network. In an example, as described above the print devices are connected via a physical network such as a Local Area Network or Wide Area Network. The connections may be wired, for example via Ethernet connections, or wireless, for example by IEEE 802.11 connections. The distributed hash table network may then be a logical network that operates on top of the physical network. In such an example, the network interface 315 may be a physical network interface for connecting with the physical network, over which data associated with the logical network may be transmitted.

The print controller 320 is configured to receive 330 a selection of a print job via the user interface 310. The user interface 310 may for example comprise a keyboard, touch-screen, or other user input device. For example, a user associated with the print job, such as the user who submitted the print job, may select a pull print option on the user interface 310. The print controller 320 may be configured to authenticate the user. This authenticating may comprise determining that the user is physically located at the print device. For example, the authenticating may comprise requiring the user to input login credentials or present a smart card to the user interface 310. These may then be compared with authentication data stored within the network of print devices.

To select the print job, the user may be prompted to enter an identifier of the print job, for example as described above. Alternatively, the user may be prompted to select the print job from a list of print jobs associated with that user.

The print controller 320 is configured to determine 335 a peer print device in the network of other print devices that has a memory storing data associated with the print job, wherein the peer print device is a printer comprising a node of the network. The determining 335 may comprise submitting a query to the network, for example where the network is a distributed hash table network. The query may comprise an identifier of the print job as described above, with which to identify the print job in question. In some examples, the determining 335 comprises determining whether said data is stored in the memory 305 of the print device 300. If it is determined that the memory 305 of the print device 300 does not store the data, the print controller 320 may submit a search query to the network, via the network interface 315, to determine said peer print device.

The print controller 320 is configured to then retrieve 340 said data from the memory of the peer print device. Where the network is a distributed hash table network, the retrieval 340 may comprise submitting a "get" command to the network, via the print interface 315. The "get" command comprises the identifier of the print job. The request is then transmitted between nodes of the network until it reaches said peer print device. In some examples, each node maintains a list of print jobs stored on neighboring nodes. The assigning of print jobs to be stored on each node may be based on a predictable pattern. The "get" query may thus be "homed in" on said peer print device as it is transmitted through the network. The data may then be transmitted back between nodes of the network until it reaches the print device 300. As such, in some examples, the determining 335 of the peer device storing the print job data and the retrieval of that data are performed with a single "get" query.

The print controller is configured to, following retrieval 340 of said data, print 345 the print job on the print device 300 using the retrieved data. This may comprise sending the print job to a standard print pipeline. The print controller 320 may be configured to, prior to printing 345 the print job, authenticate a user associated with the print job as described above.

In some examples, the print controller 320 is configured to receive the data associated with the print job as encrypted data, and to decrypt the encrypted data thereby to print the print job. Decrypting the encrypted data may comprise receiving decryption data from the user, for example as described above. The print controller 320 may also be configured to verify the print job by way of a document authenticity check. For example, the print job may be cryptographically signed by the client device that generates the print job, and the print controller 320 may then verify this signature.

Figure 4:
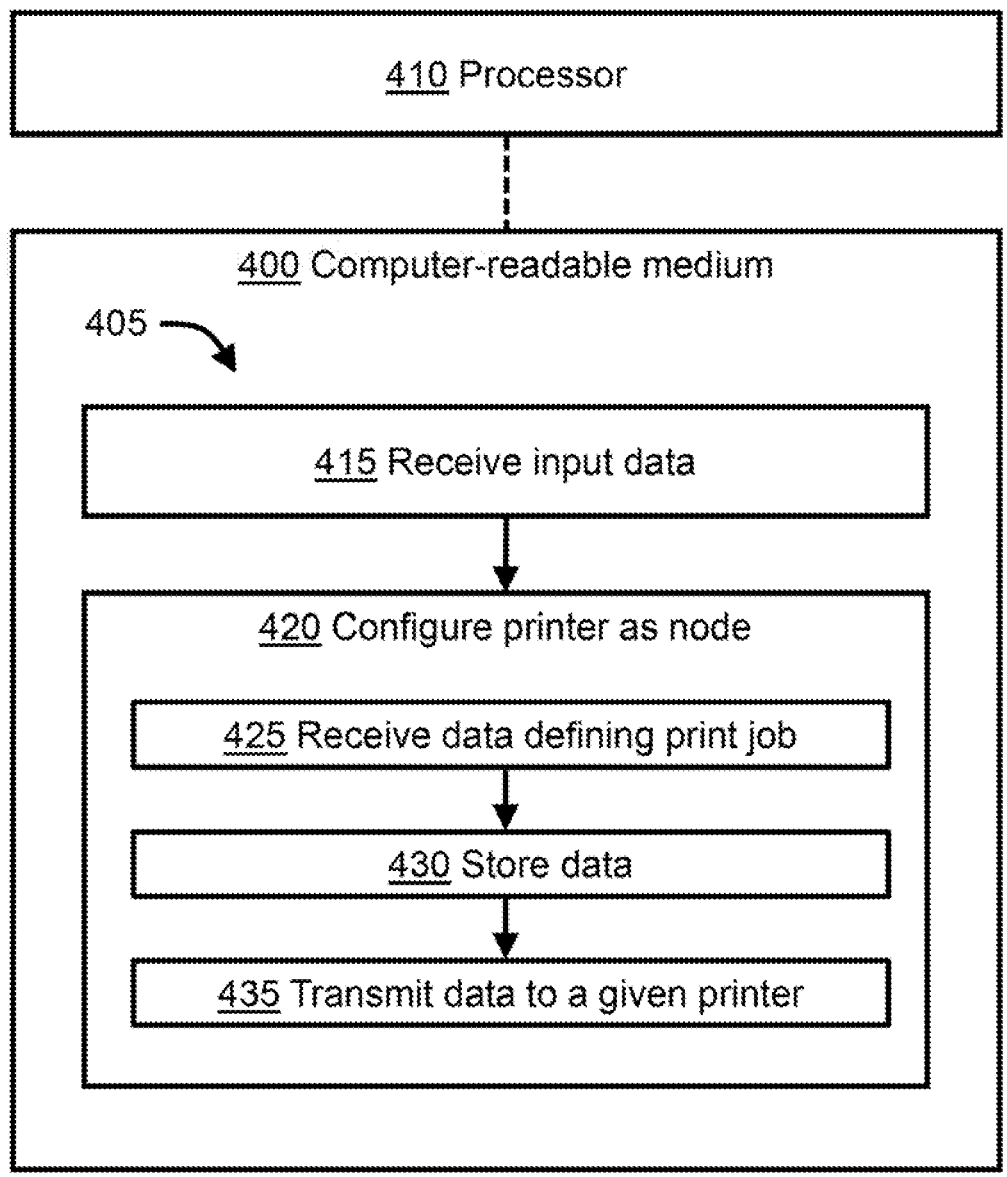
FIG. 4 is a schematic representation of a computer-readable medium according to an example.

FIG. 4 shows an example of a non-transitory computer-readable storage medium 400 comprising a set of computer readable instructions 405 which, when executed by at least one processor 410 associated with a first printer, cause the processor 410 to perform a method according to examples described herein. As described below, the method may be a method for configuring the first printer as a node of a distributed network. The computer readable instructions 405 may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

At block 415, the instructions 405 cause the processor 410 to receive input data comprising identifying information for a distributed network of printers. The distributed network of printers may for example be a distributed hash table network as described above. The identifying information may comprise an Internet Protocol (IP) address of a printer in the network. In some examples, a user indicates that the first printer should be added to the distributed network. The user may then be prompted to enter the identifying information.

The first printer may be a standard printer that is not initially configured to perform methods according to the present disclosure. A firmware update may be applied to the first printer prior to transmitting the input data to the first printer, wherein the firmware update enables the first printer to form a node of a distributed network. In other examples, such firmware may be pre-installed in the first printer during manufacture.

At block 420 the instructions 405 cause the processor 410 to, based on the input data, configure the first printer as a node of the distributed network. Configuring the first printer as a node comprises configuring the first printer to receive 425 and store 430 data defining a print job, for example as described in more detail above. Configuring the first printer as a node further comprises configuring the first printer to, responsive to user input at a given printer of the distributed network other than the first printer, transmit 435 the data defining the print job to said given printer.

In some examples, a network as described above may be instantiated by a user performing a bootstrap operation on an initial printer. For example, the user may input, via a user interface, a command to create a new network. The initial printer is configured to, responsive to such a command, set up a new logical network with the initial printer as the initial node, and to provide identifying information to the user. For example, the identifying information may comprise an IP address and/or local name which may be used to add other printers to the network as described above.

In some examples, configuration of the initial printer and other printers as described above may be performed via software installed on each printer. In other examples a management console, for example a software management console running on a computer connected to the printers, may be used to configure the initial printer and other printers as described above.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method of performing a pull printing operation, the method comprising:
    receiving at a source printer, from a client device, data defining a print job, wherein the source printer comprises a node of a decentralized distributed network of printers;
    storing the data in a plurality of printers, the plurality of printers comprising nodes of the distributed network, wherein the data defining the print job is defined in a printer description language and the data is retrievable by a destination printer, the destination printer comprising a node of the distributed network, to print the print job; and
    transmitting from the source printer to the destination printer at least a portion of the data defining the print job defined in the printer description language in response to a query from the destination printer.

2. The method according to claim 1, comprising storing the data in the plurality of printers as encrypted data.

3. The method according to claim 1, wherein the destination printer is the source printer.

4. The method according to claim 1, wherein the plurality of printers comprises the source printer.

5. The method according to claim 1, wherein the plurality of printers comprises the destination printer.

6. The method according to claim 1 comprising, if the data is not retrieved by the destination printer within a predefined time interval, deleting the data from the plurality of printers.

7. The method according to claim 1, comprising storing a complete copy of the data in a first printer of the plurality of printers and storing a complete copy of the data in a second printer of the plurality of printers.

8. The method according to claim 1, wherein storing the data comprises:
    generating an identifier; and
    storing the identifier in the plurality of printers such that the data may be retrieved responsive to a request, comprising the identifier, submitted to the network from the destination printer.

9. A print device comprising:
    a memory to store print job data;
    a user interface;
    a network interface to couple the print device to a network of other print devices;
    a print controller to:
        receive a selection of a print job via the user interface;
        determine a peer print device in the network of other print devices that has a memory storing data associated with the print job;
        query the peer print device for the data associated with the print job;
        retrieve the data from the memory of the peer print device over the network in response to the query, wherein the data associated with the print job is defined in a printer description language; and
        print the print job on the print device using the retrieved data.

10. The print device according to claim 9, wherein the print controller is configured to:
    receive the data associated with the print job as encrypted data; and
    decrypt the encrypted data thereby to print the print job.

11. The print device according to claim 9, wherein the network is a distributed hash table network.

12. The print device according to claim 11, wherein determining the peer print device comprises submitting a query to the distributed hash table network, the query comprising a hashed identifier of the print job.

13. The print device according to claim 9, wherein the print controller is configured to, prior to printing the print job, authenticate a user associated with the print job.

14. The print device according to claim 13, wherein authenticating the user comprises determining that said user is physically located at the print device.

15. A non-transitory computer-readable storage medium comprising a set of computer-readable instructions stored thereon which, when executed by at least one processor associated with a first printer, cause the at least one processor to:
    receive input data comprising identifying information for a distributed network of printers;
    based on the input data, configure the first printer as a node of the distributed network, wherein configuring the first printer as a node comprises configuring the first printer to:
        receive data defining a print job, wherein the data defining the print job is defined in a printer description language;
        store the data defining the print job; and
        transmit the data defining the print job defined in the printer description language to a given printer in response to a query from the given printer.

* * * * *